May 7, 1935.  G. F. TAUCHMANN  2,000,303
REFLECTOR MOUNTING
Filed Oct. 15, 1932
FIG.1.
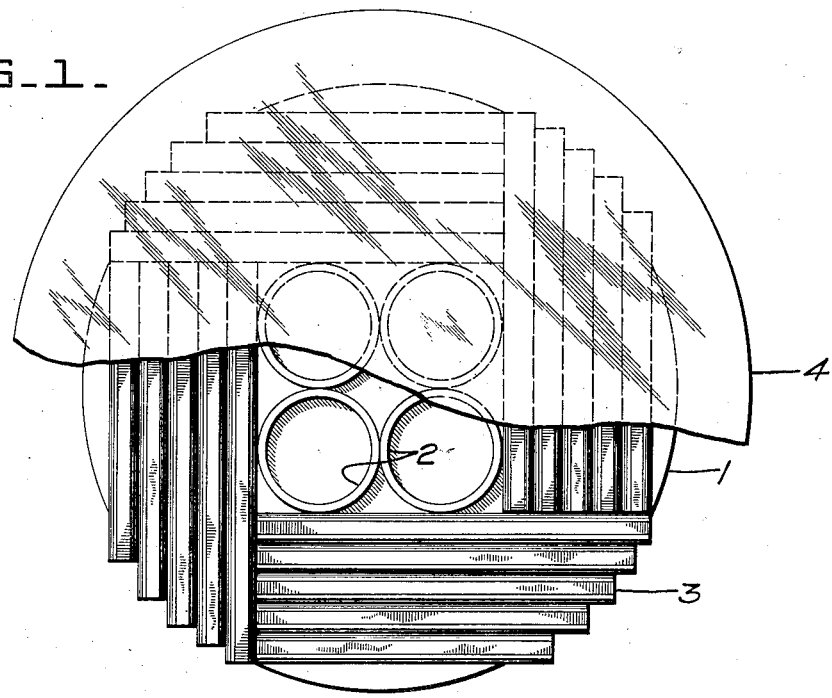
FIG.2.
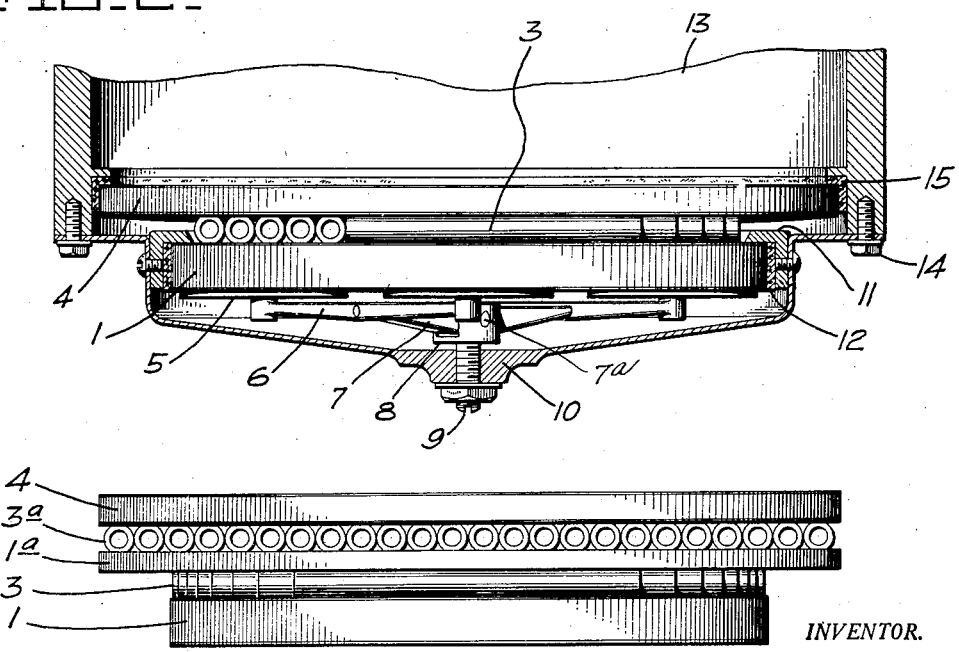
FIG.3.
INVENTOR.
George F. Tauchmann
BY
ATTORNEY.

Patented May 7, 1935

2,000,303

UNITED STATES PATENT OFFICE 2,000,303

REFLECTOR MOUNTING

George F. Tauchmann, Berkeley, Calif.

Application October 15, 1932, Serial No. 637,887

5 Claims. (Cl. 88—105)

The present invention relates to reflectors, and particularly to an improved structure for supporting mirrors of great weight in applications where it is desired to minimize distortion due to temperature changes, mechanical stresses, et cetera, as in astronomical telescopes and similar apparatus.

An object of the invention is to provide a reflector structure in which distortion due to stresses set up by temperature differences in various parts of the mirror will be minimized.

Another object of the invention is to provide a reflector structure in which the reflecting element is free from mechanical stresses imposed by clamps or similar devices used to hold it in operating position.

Another object of the invention is to provide a structure of this type which will have sufficient strength when assembled by cementing the elements together, to render difficult and expensive fusing operations unnecessary.

Other objects will appear in the course of this specification disclosing a preferred embodiment of the invention, reference being had to the accompanying drawing in which:

Figure 1 is a plan view of the improved reflector, a portion of the mirror being cut away to show details of its supporting structure;

Figure 2 is a side elevation of the improved reflector mounted in operating position in one end of a telescope, the elements of the telescope and mounting being partly sectioned; and Figure 3 is a side elevation of a modified form of the reflector shown in Figures 1 and 2, disclosing a structure adapted to support larger mirrors.

The speculum of a reflecting telescope or similar apparatus is commonly made of a single block of glass ground and polished to the required shape and then silvered. Due to the necessity for minimizing distortion of the reflecting surface, these blocks have been made of costly glasses especially designed to have a very low coefficient of expansion, thus minimizing distortion due to differences of temperature within the block, and the blocks have been dimensioned to a ratio of thickness to diameter of from 1 to 8 up to 1 to 6 in order to provide sufficient strength to prevent distortion due to bending of the block under its own weight or under the stresses imposed thereon by the devices used for clamping it in operating position. It will be noted that the thickness necessary for strength renders the block more liable to distortion by internal temperature differences.

According to the present invention, the speculum itself is made of a block of glass dimensioned to a ratio of thickness to diameter of only from approximately 1 to 30 up to 1 to 20, rigidity being imparted thereto by a second block of greater thickness and equal or smaller diameter, to which the first block is firmly attached by means permitting the circulation of air between the blocks.

A very strong and easily assembled structure of this type is shown in Figures 1 and 2 of the accompanying drawing. The flat supporting block 1 is first ground to provide a satisfactory cementing surface and four short sections of tubing 2 are then cemented thereto about its center by means of a pyroxilin or similar cement. A number of sections of smaller gass tubing 3 are then ground flat on opposite sides to a diameter from flat to flat equal to the length of tubes 2 and positioned in a plurality of angularly related groups around tubes 2 as shown in Figure 1. One of the flat sides of each tube 3 is then cemented to block 1, and the speculum block 4 is similarly cemented to the upper flat sides of tubes 3 and ends of tubes 2. This provides, when the cement has set, an assembly of sufficient strength to permit grinding, polishing, and silvering of the speculum block without relative displacement of the cemented elements, and the reflecting element is thus made.

The reflector structure thus provided has a weight less than half of that necessary for a single-block mirror of equal diameter, thus decreasing the liability of warping due to weight, and the tube structure, by permitting circulation of air around the comparatively thin speculum block 4 causes any temperature variation to be substantially uniform throughout the block, thus minimizing distortion from that source.

Distortion due to stresses imposed by the elements used to hold the speculum in operating position is avoided by imposing such stresses only upon the supporting block 1. As shown in Figure 2, the supporting block 1 rests upon a spider comprising four plates 5, each pair of which is carried on an arm 6, the said arms being connected to a common lever 7 journaled for rocking movement about a pin 7a in a hub 8. By means of an adjusting screw 9 threading into the telescope end piece 10, and bearing against said hub 8, the spider may be raised and lowered to clamp the block 1 between itself and lugs 11 also secured to end piece 10 and provided with cork cushions 12. The pivotal mounting of lever 7 in hub 8 equalizes the clamping pressure during this operation.

With the reflector clamped in place in the end piece 10, the entire assembly may be secured to the telescope tube 13 by means of bolts 14 leaving the speculum 4 free from all clamping strains and supported only by tubes 2 and 3 to which it is cemented. The soft felt ring 15 is provided only as a cushion to prevent transmission of vibration to the speculum.

Figure 3 shows a modified form of speculum support adapted for use with larger specula and comprises an intermediate supporting plate 1ª and an intermediate tube assembly 3ª interposed between the tube assembly 3 and supporting plate 1 of Figure 1. By the use of such a pyramidal structure the advantages of the present invention may be extended to reflectors of very large diameter.

While a preferred embodiment of the invention has been described herein, it is understood that the invention may be embodied in other equivalent forms varying the arrangement of the tube structure and otherwise, and it is therefore understood that the scope of the invention is limited only by the following claims.

I claim:

1. In a reflector mounting, a plate having a reflecting surface, a supporting plate, and means securing said plates together in spaced relation to each other comprising a plurality of apertured spacing elements in angularly abutting relation with each other and having their opposite sides secured to said plates by an adhesive substance.

2. In a reflector mounting, a plate having a reflecting surface, a supporting plate, and means securing said plates together in spaced relation to each other comprising a plurality of groups of apertured spacing elements interposed between said plates and secured thereto by an adhesive substance, each of said groups being arranged at an angle to and abutting each adjacent group.

3. In a reflector mounting, a plate having a reflecting surface, a supporting plate, and means securing said plates together in spaced relation to each other comprising a plurality of groups of horizontally disposed tubular members interposed between said plates and secured thereto, each of said groups being arranged at an angle to each adjacent group.

4. In a reflector mounting, a plate having a reflecting surface, a supporting plate, and means securing said plates together in spaced relation to each other comprising a plurality of tubular elements horizontally disposed in abutting relation between said plates and secured thereto.

5. In a reflector mounting, a plate having a reflecting surface, a supporting plate, and means securing said plates together in spaced relation to each other comprising members of greater horizontal dimensions than the vertical spacing of said plates, interposed in vertical position between said plates and secured thereto by an adhesive substance.

GEORGE F. TAUCHMANN.